United States Patent [19]

McMurray

[11] Patent Number: 4,863,701
[45] Date of Patent: Sep. 5, 1989

[54] APPARATUS FOR GENERATING OZONE

[76] Inventor: Larry D. McMurray, 14421 29th Ave. S., Seattle, Wash. 98168

[21] Appl. No.: 101,070

[22] Filed: Sep. 25, 1987

Related U.S. Application Data

[63] Continuation-in-part of Ser. No. 804,918, Dec. 5, 1985, abandoned.

[51] Int. Cl.$^4$ ............................................. C01B 13/10
[52] U.S. Cl. .......................... 422/186.08; 422/186.14; 422/186.15; 422/186.18; 239/58
[58] Field of Search ...................... 422/186.07, 186.08, 422/186.12, 186.14, 186.18, 186.15; 204/176; 219/271; 239/34, 53, 54, 55, 58

[56] References Cited

U.S. PATENT DOCUMENTS

| 1,044,700 | 11/1912 | Small et al. | |
|---|---|---|---|
| 2,952,606 | 9/1960 | Pascale et al. | 422/186.07 X |
| 3,352,775 | 11/1967 | McNamara | |
| 3,410,488 | 11/1968 | Sugimura | 239/55 |
| 3,442,788 | 5/1969 | Wooton et al. | |
| 3,549,528 | 12/1970 | Armstrong | |
| 3,711,023 | 1/1973 | Smith | 239/55 X |
| 3,842,286 | 10/1974 | Imris | |
| 4,065,261 | 12/1977 | Fukada | 239/58 X |
| 4,216,000 | 8/1980 | Kofoid | 55/155 X |
| 4,227,234 | 10/1980 | Seanor et al. | 174/110 R |
| 4,288,239 | 9/1981 | Hoeh | 65/110 |
| 4,386,055 | 5/1983 | McBride | |
| 4,389,277 | 6/1983 | de Vries | 156/273.1 X |
| 4,752,422 | 6/1988 | Uchida et al. | 239/58 X |

Primary Examiner—John F. Terapane
Assistant Examiner—Susan Wolffe
Attorney, Agent, or Firm—Mark Zovko

[57] ABSTRACT

Apparatus for the generation of ozone by electrostatic discharge. An array of glass tubes are provided each containing a conductive rod therein serving as a core. Adjacent tubes are parallel to each other and the conductive rod of each tube is connected to the secondary terminal of a high voltage transformer. The tubes containing the conductive rods serve as an electrode when the voltage transformer is activated thereby creating an electrostatic field. Oxygen molecules in the electrostatic field are transformed to form ozone molecules. The apparatus can be applied to deodorizing an enclosed space with the addition of a fan to feed oxygen past the tube array and distribute the ozone that is generated. The apparatus also has an odor emitting chamber to prevent excess ozone build up after operation.

1 Claim, 1 Drawing Sheet

U.S. Patent  Sep. 5, 1989  4,863,701
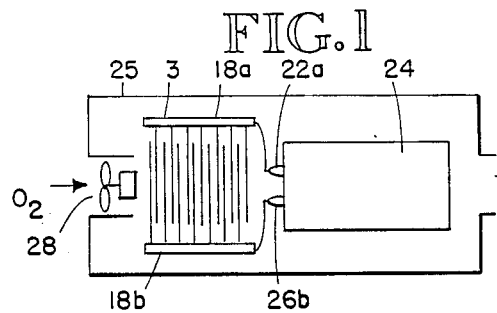
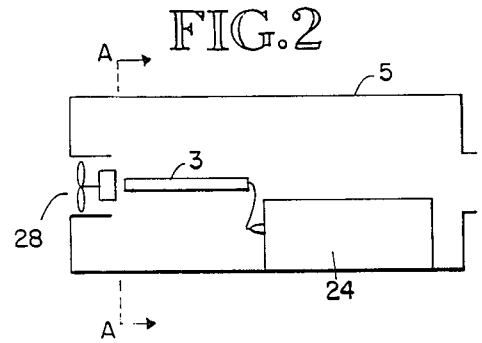
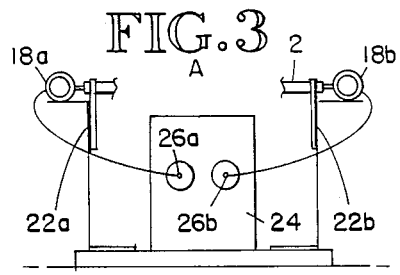
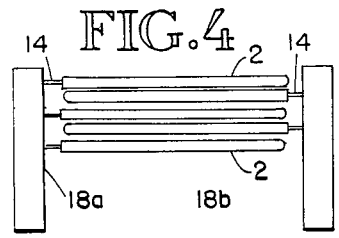
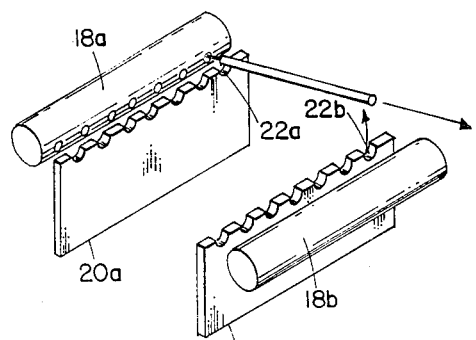
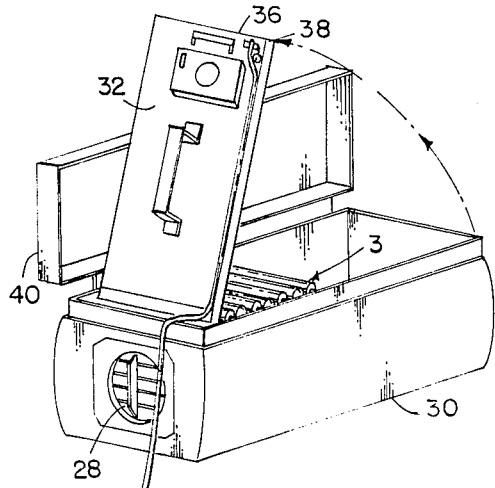
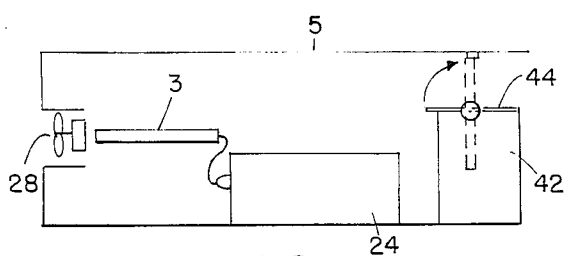
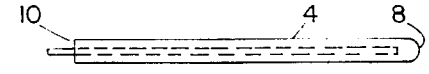
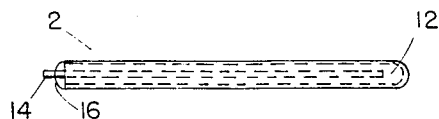

APPARATUS FOR GENERATING OZONE

CROSS RELATION TO OTHER APPLICATION

This application is a continuation-in-part of applicant's co-pending application Ser. No. 804,918, filed 12/5/85, now abandoned.

BACKGROUND OF THE INVENTION

1. Field of the Invention

This invention relates in general to ozone generating apparatus and more particularly to a novel apparatus for producing ozone especially for the elimination of odors in enclosed spaces.

2. Discussion of the Prior Art

Ozone generating apparatus has taken on many forms in the prior art. A patent search in the United States, for example, has revealed the following U.S. patents:

| U.S. Pat. No. | Inventor | Issue Date |
| --- | --- | --- |
| 3,838,290 | Crooks | 9/24/74 |
| 3,865,733 | Taylor | 2/11/75 |
| 4,124,467 | Pincon | 11/7/78 |
| 4,156,652 | Weist | 5/29/79 |

Generally these devices are different in structure and function, and result in comparison with the present invention. The present invention offers a durable, lightweight ozone generating apparatus with a novel construction which can economically deodorize an enclosed area.

In the parent application, cited and applied references included U.S. Pat. No. 3,352,775 issued to McNamara, U.S. Pat. No. 3,842,286 issued to Imris et al, U.S. Pat. No. 3,442,788 issued to Wooten et al, and U.S. Pat. No. 1,044,700 issued to Small et al. None of the above patents teach the use of a soda-lime glass as does the present invention.

Applicant has found through experimentation that the glass in the glass tubes for his application should be soda lime glass. Other types of glass tubes will begin clouding soon after operation of the ozone generating device and thus reducing ozone output by about a factor of 4. The above references cited are generally for applications in which space limitations are not a problem. Typically, applicant has 4 mm diameter glass tubes and the rods within adjacent tubes are spaced 4 mm apart likewise. Relative to the references, applicant's apparatus has a much greater field intensity due to a smaller glass tube radius.

The above problem was not foreseen by McNamara. If any glass tubes were used other than soda lime glass, inoperability of applicant's apparatus would result. McNamara is silent with respect to soda lime glass as the dielectric, and it would not be obvious given McNamara to use this special type of glass.

Wooten et al., Imris, Lowther or Small et al., do not disclose soda lime glass as being critical to the operation of their respective apparatus, and it would not be obvious given either of these references above or in any combination to use soda lime glass.

SUMMARY OF THE INVENTION

The present invention comprises apparatus for producing ozone, especially for the elimination of undesirable odors from enclosed spaces. The apparatus consists of at least a pair of ozonizer tubes, the tubes being open on one end and closed on the other end. The tubes are made of a dielectric material such as glass and arranged parallel to each other. The open end of one tube is aligned 180° from the open end of the paired tube. Ideally about 2 millimeters spacing is provided between tubes. Inside of the ozonizer tubes is placed a rod of a conductive material such as stainless steel which also has the advantage of being non-corrosive. The rod is placed within the tube with its tip protruding from the open end of the tube. The tube at its open end containing the rod is sealed with a silicon sealant. Sockets are provided to receive the tips of the rods extending from the tubes as the tubes are arranged parallel to each other with the tips of adjacent rods within the tubes aligned 180° from each other. A support to support the tubes is provided and is preferably made of teflon or the like. The sockets are connected to a source of voltage such as a voltage transformer which operates from AC current. Ideally 7500 volts (30 ma) is used for the voltage drop. Subjecting the rods to this high voltage drop creates an electrode from the assembled tubes and generates an electrical discharge whereby oxygen molecules from the air are converted to ozone molecules.

At this point, the above apparatus can be used in conjunction with a fan to supply a stream of air past the tubes, the end result being a stream of ozone emitted by the apparatus. The ozone can be channeled into a space containing undesirable odors such as tobacco smoke, etc., to allow the ozone to break down the molecules creating the odor and hence purify the air in the enclosed space. It should be noted that any number of pairs of ozonizer tubes in parallel can be used, a greater number of tubes generating a larger volume of ozone.

The apparatus also has an additional safety feature present which results in any excessive ozone production to be counteracted by a odor emitting chamber. The chamber is located downstream of the fan and after the ozone producing cycle is complete and the undesired odor eliminated, the chamber can emit an odor which is pleasant, a conventional air freshening odor which would react with excess ozone if present. The chamber could be operated on a timed cycle by conventional timing means to begin after ozone production ceases. A user of the device would be assured that the deodorized space does not retain a high ozone concentration after the ozone production ceases.

It is, therefore, an object of the present invention to provide apparatus for generating ozone that is economical to produce and manufacture.

Another object of the present invention is to provide apparatus for the generation of ozone which yields a consistant output due to its composition.

Another object of the present invention is to provide apparatus for generating ozone which is sealed at atmospheric pressure for greater durability and stability.

Still another object of the present invention is to provide apparatus for generating ozone which uses glass tubes and has a relatively long useful life.

Yet another object of the present invention is to provide an apparatus which generates ozone and can be used in enclosed spaces to eliminate unwanted odors safely and effectively.

Still another object of the present invention is to provide an improved ozone generating system characterized by its simplicity and efficiency.

Another object of the present invention is to provide an ozone generating apparatus for deodorizing an enclosed space which will not result in high ozone levels in that enclosed space after the operation of the apparatus.

The features of the present invention which are believed to be novel are set forth with particularity in the appended claims. This invention itself both as to its organization and manner of operation, together with further objects and advantages thereof, may be best understood by reference to the following descripton taken in conjunction with the accompanying drawings.

BRIEF DESCRIPTION OF THE FIGURES

FIG. 1 is an overhead view of the apparatus of the present invention showing the ozone tubes in an array.

FIG. 2 is an elevation view of the apparatus shown in FIG. 1 in accordance with the present invention.

FIG. 3 is a sectional view of the apparatus of the present invention along line A—A of FIG. 2.

FIG. 4 is a detail showing the ozone tubes in an array.

FIG. 5 is a perspective view showing a tube being fit into a socket array in accordance with the present invention.

FIG. 6A shows a rod of the present invention.

FIG. 6B shows a glass tube of the present invention.

FIG. 6C shows a rod assembled in a glass tube to form an electrode in accordance with the present invention.

FIG. 7 is a perspective view of the ozone generating apparatus of the present invention assembled in a convenient carrying case.

FIG. 8 is an elevational view of the apparatus featuring the odor-emitting chamber in accordance with the present invention.

DETAILED DESCRIPTION OF THE PREFERRED EMBODIMENT

Referring to the accompanying FIGS. 1 through 7, the present invention of an ozone generating apparatus can be described. An ozone tube generally designated as 2 is shown which is comprised of a tube 4 of a dielectric material such as glass and a rod 6 of a conductive material such as steel. Preferably the tube 4 is made of a soda lime of "flint" glass and the rod 6 of stainless steel. Soda lime glass has the advantage over other glass with respect to its ability to resist becoming "fogged" or dirty during the ozone generating process. Stainless steel has the obvious advantage of allowing rod 6 to be conductive yet corrosion resistant. Tube 4 has a closed end 8 and an open end 10. Rod 6 is fit into the open end 10 of tube 4 and is housed therein during operation of the apparatus. A gap 12 exists at the closed end 8 of tube 4. This gap 12 is between the end rod 6 and the end 8 of tube 4. At the open end 10 of tube 4, the tip 14 of rod 6 is allowed to project therefrom slightly as seen best in FIG. 6C. Rod 6 fits within tube 4 and is housed therein except for the tip 14. A sealant 16 is used to seal the open end 10 of tube 4 containing rod 6. Preferably the sealant 16 is a conventional silicon sealant sealed at atmospheric pressure.

Referring to FIGS. 1 through 4, the arrangement of an array 3 of ozonizing tubes 2 is shown in a housing. The assembled ozone tubes 2 are the glass tubes 4 which contained rods 6 therein sealed with sealant 16 as shown in FIG. 6C. These assembled tubes 2 are placed in socket arrays 18a and 18b forming an array 3 of ozonizing tubes. Socket arrays 18a and 18b consist of conventional sockets in a bank or series. The tip 14 of rod 6 is placed in the appropriate socket of socket array 18a or 18b. In the embodiment of this invention the assembled ozone tubes are arranged to produce opposite polarity between adjacent tubes.

In an array 3 of tubes 2, one tube 2 will be placed with the tip 14 of rod 6 in socket array 18a. The adjacent tube 2 will be placed with the tip 14 of rod 6 in socket array 18b. This pattern is continued until the desired number of ozone tubes 2 is assembled in the socket arrays 18a and 18b as seen best in FIG. 4. Generally, the present invention needs at least two ozone tubes 2 arranged in opposite polarity as describe above. Additionally, paired ozone tubes 2 will produce an increase in the amount of ozone generated. Depending on the application, the number of ozone tubes 2 therefore will be at least two and could be increased to any desired number in pairs to continue the opposite polarity of adjacent ozone tubes 2. It should also be noted that adjacent ozone tubes 2 are parallel to each other with a gap of about 2 mm being preferable for maximum efficiency of the apparatus. Additional support for the ozone tubes 2 is provided by tube supports 20a and 20b located near the end of the ozone tube 2. The supports 20a and 20b have semi-circular cut-out portions 22a and 22b to receive the ozone tubes 2, and provide support thereto. In combination with the above described apparatus, a voltage transformer 24 is used which can take power from a power source such as 115 volt conventional outlet (not shown). The secondary terminals 26a and 26b of the voltage transformer are connected to the socket arrays 18a and 18b and consequently the rods 6 of the ozone tubes 2. A suitable voltge drop is chosen, such as 7500 volts (at 30 milliamps), and an electrostatic charge is created in the ozone tubes 2. Each tube 2 becomes an electrode and the consequent electrostatic charge will begin the process of converting oxygen surrounding the tubes 2 into ozone. The high energy of the electrostatic field causes the oxygen molecule to add another oxygen radical to form ozone.

The above described apparatus has a practical and useful application as an odor eliminator. Ozone, once formed by exciting oxygen, cannot recombine to the oxygen state by itself. The ozone molecule does this by losing one-third of its weight. It can do this easily since in an environment having odors and/or particles of organic matter the odors and/or particles are actively seeking the ozone. In combining with an organic particle, the organic matter is reduced to an inert, odorless particle. Of course, the ozone is reduced to oxygen. In combination with the above described ozone generating means, a fan 28 could be mounted in housing 5 in a conventional manner to circulate air around and past the tubes 2 as best shown in FIG. 1. The ozone generated can be then directed through outlet 29 to the desired environment by the fan 28 which would also serve to continually supply oxygen to the apparatus. Placed in an enclosure to be deodorized, this apparatus can be used to eliminate unwanted odors and will reach all the places that air would reach.

FIG. 7 shows the housing 5 of the apparatus to be a carrying case 30 which is portable. In this embodiment the carrying case 30 would include a tube cover 32 to cover the array 3 of tubes 2 within case 30. Tube cover 32 would have a handle 34 and a timer 36 with a switch 38 connected to a power outlet (not shown). The carrying case 30 would also have a lid 40, and fan 28 of FIG. 1 would be located within the case 30. This apparatus could be conveniently carried to any desired location and easily operated by setting timer 36 to a desired time and closing switch 28. The operator could then leave the space and return after the apparatus has shut itself off.

Referring to FIG. 8, an additional embodiment of the present invention can be described which contains a built in safety feature. FIG. 8 shows an array of ozonizing tubes 3 with a fan 28 upstream of the tubes 3 as also shown in FIG. 3. A voltage transformer 24 is connected to the array of ozonizing tubes 3. A chamber 42 is also present located in housing 5 of the apparatus which contains a substance which, if exposed to ozone, would deplete or breakdown ozone molecules. A typical substance such as a common perfume could be used or the like. The chamber 42 is located downstream of the fan 28 and can be sealed by a valve 44 wuch as a butterfly valve. Sealing would occur when valve 44 is in a horizontal position. When value 44 is caused to be moved to a vertical position as shown in dotted lines, the chamber 42 is open to the stream of air directed by the fan 28. The air stream would allow the perfume from chamber 42 to be released to the atmosphere surrounding the apparatus thereby depleting any residual ozone concentration after the ozone generating cycle is complete. A control timer (not shown) can be used to implement the opening and closing of valve 44. The timer would be connected to the voltage transformer 24, the fan 28 and the valve 44, and would maintain valve 44 closed when the voltage transformer and fan are operational and producing ozone. When ozone production is halted, the timer would continue operation of the fan 28 and cause the valve 44 to open thereby releasing the perfume to the atmosphere surrounding the apparatus. The timer would be a conventional device well known in the prior art, the system would then function with a "fail safe" safety feature. The fail safe system would guarantee that the environment that is to be occupied immediately after ozone treatment is free of a potential harmful concentration of residual ozone which normally can result from ozone treatments. This guarantee in the system would be present regardless of ventilation considerations and would allow the apparatus to comply with strict health compliance standards.

The invention may be embodied in other forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim is:

1. Apparatus for producing ozone for the elimination of odor which comprises:
   a. at least two tubes, said tubes having an open end and a closed end, said tubes being made of soda lime glass, said tubes arranged parallel to each other with a gap of at least 2 mm between said tubes; the open end of one of said tubes aligned 180° from the open end of the adjacent tube;
   b. at least two rods of a conductive material, each rod being housed partially within one of said tubes with the tip of said rod extending from the open end of said tube;
   c. sealing means for sealing the open end of said tubes containing said rods;
   d. socket means to receive the tip of said rods which extends from the open end of said tubes as said tubes are arranged parallel to each other with the tip of adjacent rods within said tubes 180° from each other.
   e. support means for holding said tubes containing said rods in a parallel position;
   f. a source of voltage connected to said socket means for generating at least 7500 volt voltage drop across each of said rods so as to create an electrical discharge whereby oxygen molecules around and between said tubes containing said rods can be changed to ozone;
   g. fan means located adjacent to said tubes to feed air past said tubes;
   h. a chamber downstream of said fan means, said chamber containing a substance which releases a vapor that causes breakdown of ozone molecules, said chamber being closed when ozone is being produced by the apparatus;
   i. valve means communicating with said chamber whereby the closure of said valve means seals said chamber and the opening of said valve means opens said chamber to the air being moved by said fan means; and
   j. timing control means connected to said source of voltage, to said fan means and to said valve means whereby said timing control means maintains said valve means closed and said fan means operational when said source of voltage is generating sufficient voltage for ozone production and opens said valve means and maintains said fan means operational when ozone production caused by said source of voltage is stopped.

* * * * *